June 25, 1968     I. MALAKOFF     3,390,044
ARTIFICIAL GRASS MAT
Filed June 2, 1967
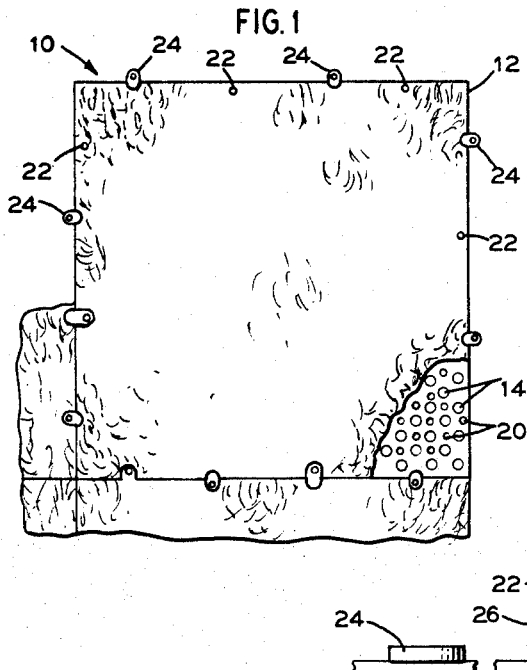
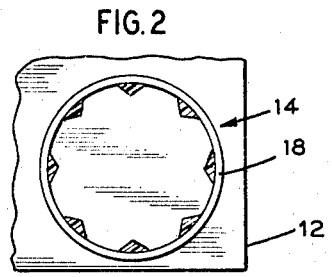
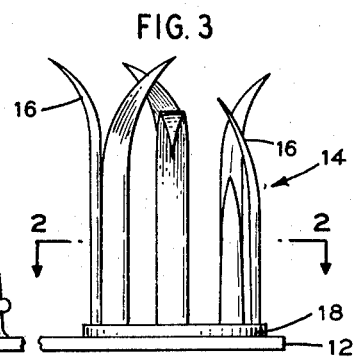
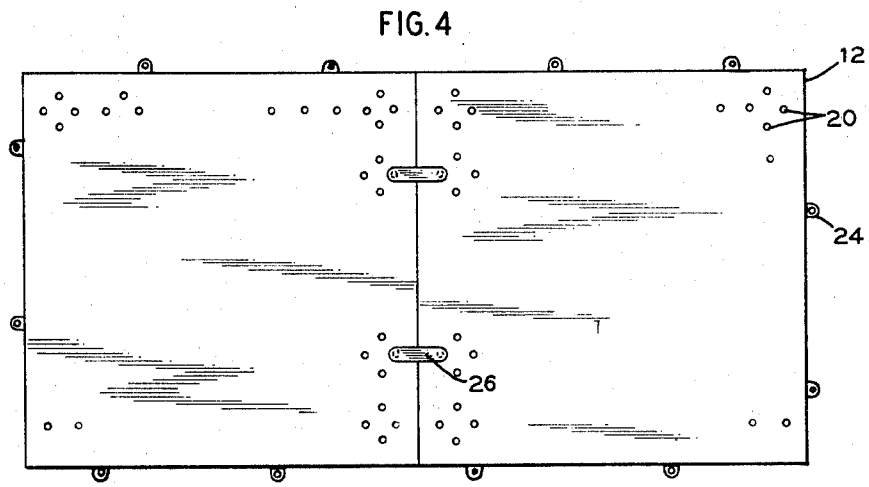
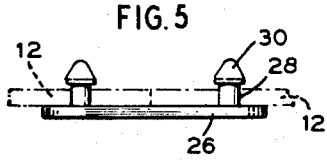
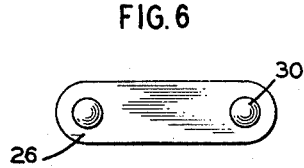
INVENTOR.
Irving Malakoff
BY
ATTORNEY

United States Patent Office 3,390,044
Patented June 25, 1968

3,390,044
ARTIFICIAL GRASS MAT
Irving Malakoff, Cliffside Park, N.J., assignor to
Obi Inc., Ridgefield, N.J.
Filed June 2, 1967, Ser. No. 643,152
7 Claims. (Cl. 161—19)

ABSTRACT OF THE DISCLOSURE

An artficial grass mat that includes a plastic sheet having a plurality of blade units molded integrally thereto. Each unit has a plurality of blade elements upstanding from the plastic sheet, with the base portion of the blade elements in each unit being adjacent each other and in circular arrangement. A plurality of collar members are molded integrally with the plastic sheet, with each collar member encircling an associated blade unit and in contact with the base portion of the blade elements thereof. There is also provided co-acting means on adjacent mats for connecting said mats together.

Field of the invention

This invention relates generally to an artificial grass mat and more particularly to a grass mat wherein the blade elements are arranged to closely simulate and give the appearance of natural grass.

Description of the prior art

Heretofore, artificial grass mats have been proposed such as shown in U.S. Patent No. 3,157,557. This patent shows a base section of thermoplastic material that is provided with a multiplicity of slender stem portions that are molded integral with the upper surface of the base.

The major difficulty and disadvantage of the aforesaid artificial grass mat reside in the slender stem portions which, because of their thin size, break off quite easily from the base. If, on the other hand, the stem portions were to be made thicker, then the stem portions would no longer resembled natural grass or simulate the appearance thereof.

In addition, the plastic sod of U.S. Patent No. 3,157,557 fails to simulate the appearance of natural grass because of the insufficient density distribution of the stem portions, and because the ends of all of the stem portions terminate in the same plane with respect to the base. This last feature is totally unrealistic and does not occur even in freshly mowed natural grass.

The present invention eliminates the above difficulties and disadvantages by providing an artificial grass mat wherein the blade elements are reinforced at their base portions to prevent breakage thereof, and are formed and arranged on the base sheet in a manner to closely simulate the appearance of natural grass.

Summary of the invention

The artificial grass mat of the present invention includes a flexible plastic sheet having a plurality of plastic blade units molded integrally thereto and arranged in rows. Each unit has a plurality of plastic blade elements upstanding from the plastic sheet, with the base portion of the blade elements in each unit being adjacent each other and in circular arrangement. The units in each row are in staggered relation to the units in the rows adjacent thereto, and the blade elements in each unit are of differential height with the longer blades in each unit terminating respectively in a curved upper end portion. Each of the above features, taken either alone or in combination, provides a density distribution of the blade elements having the appearance of natural grass.

The present invention further provides for a plurality of collar members molded integrally with the plastic sheet; each collar member encircling an associated blade unit and in contact with the base portion of the blade elements of said unit. The collar members thus reinforce the blade elements to prevent breakage thereof. There is also provided co-acting means on adjacent mats for connecting said mats together.

Accordingly, an object of the present invention is to provide an artificial grass mat that closely simulates and gives the appearance of natural grass.

Another object and feature of the present invention is to provide an artificial grass mat that will have improved durability when subjected to rough handling and repeated usage.

The above and other objects, features and advantages of the present invention will become more apparent from a consideration of the following detailed description when taken in conjunction with the accompanying drawings.

Brief description of the drawings

FIG. 1 is a top plan view of the artificial grass mat constructed according to the present invention, the blade elements in one corner being cut away to show the collar members;

FIG. 2 is an enlarged view of one of the collar members shown in FIG. 1, and is a sectional view taken through line 2—2 of FIG. 3;

FIG. 3 is a fragmentary side elevational view of the artificial grass mat shown in FIG. 1;

FIG. 4 is a bottom plan view of adjacent grass mats connected together;

FIG. 5 is a side elevational view of a connecting link; and

FIG. 6 is a top plan view of the link shown in FIG. 5.

Description of the preferred embodiment

Referring to the drawings, numeral 10 represents an artificial grass mat preferably molded of a plastic material, such as polyethylene or the like. The grass mat comprises a flexible plastic sheet 12 having a plurality of plastic blade units 14 molded integrally with the upper surface of the sheet 12. As seen in FIG. 1, the blade units 14 are arranged in rows whereby the units in each row are in staggered relation to the units in the rows adjacent thereto to provide a density distribution of the blade elements having the appearance of natural grass.

Referring to FIGS. 1, 2 and 3, each unit 14 is provided with a plurality of upstanding plastic blade elements 16 having base portions which are adjacent each other and in circular arrangement. It has been found that this circular arrangement provides for a more natural looking appearance of the grass mat and further increses the density distribution of the blade elements thereof. Each blade element 16 is formed substantially triangular in cross section and the blade elements in each unit are of differential height with the longer blades terminating respectively in a curved upper end portion simulating the appearance of natural grass.

The present invention further provides for a plurality of plastic collar members 18 molded integrally with the plastic sheet 12. Referring to FIGS. 2 and 3, each collar member 18 is shown as encircling an associated blade unit 14 and in contact with the base portion of the blade elements 16 thereof. It will be appreciated that the collar members 18 thus reinforce the blade elements 16 at their base portions to prevent breakage of said elements when the grass mat is in use.

The plastic sheet 12 is also provided with spaced drain openings 20 to permit drainage and cleaning. The drain openings 20 are also used for interconnecting adjacent mats in a manner hereinafter described.

The grass mat is preferably molded in squares 12" x 12" and is provided with co-acting means for interconnecting adjacent mats to make areas as large as needed. Assembly and installation are relatively easy, and pair of scissors is all that is necessary to cut the shape of the square to fit a selected area. Each grass mat may be cemented down to any surface with a suitable adhesive, yet can be rolled up for removal when required, stored and replaced or moved. Where installation over unpaved ground is required the grass mat can be held firmly in place by pushing coated screw shank nails through the drain openings 20 into the ground.

The preferred co-acting means for interconnecting adjacent mats is shown in FIGS. 1 and 3, and comprises a plurality of spaced studs 22 and perforated tabs 24 projecting from edge portions of each mat. Each stud 22 is formed having detent means thereon, such as rib portion 26, with said rib portion being spaced from the top surface of sheet 12 by a distance at least equal to the thickness of a tab 24. Furthermore, the hole in each tab 24 is of a diameter substantially equal to the diameter of a stud 22. Accordingly, it will be appreciated that correlated pairs of studs and tabs of adjacent mats interengage each other, as shown in FIG. 1, whereby the stud is received within the perforated tab with the tab being snapped over the rib portion of said stud.

There is also provided additional co-acting means for interconnecting adjacent mats, such as shown in FIGS. 4, 5 and 6, wherein a flexible link 26 is provided having a pair of spaced studs 28 upstanding therefrom. Each stud 28 has a diameter substantially equal to the diameter of a drain opening 20, and is provided with a reentrant or shouldered head 30; the height of the stud to its shouldered head being at least equal to the thickness of the sheet 12. Accordingly, it will be appreciated that with a link 26 located beneath adjacent mats, the link studs 28 are received in a pair of drain openings 20 located respectively in adjacent mats, as shown in FIGS. 4 and 5, whereby the adjacent sheets 12 are snapped over the shouldered heads of the respective studs.

The co-acting means described above for interconnecting adjacent mats provide a firm interlocking arrangement which hides the seams along adjacent mats to obtain a uniform natural appearing carpet of grass. Furthermore, each grass mat has over 7,000 individual blade elements that provide a full, lush, green, natural look to the area of installation. The coloring of the grass mat is relatively permanent, and the grass mat is relatively cheap to manufacture and install. It requires no maintenance and can be used indoors or outdoors.

While the diameter of the respective blade units at the base thereof is uniform and approximately ⅜", it is understood that such diameter can be varied, if desired. Furthermore, it will be appreciated that the base portions of the blade elements in each unit may be in lateral contact with each other, in which case, the collar members 18 may be omitted.

While a specific embodiment of the invention has been shown and described in detail, it will be readily understood and appreciated that various changes or modifications thereof may be made without departing from the spirit and scope of the invention as set forth in the appended claims.

I claim:
1. An artificial grass mat comprising:
 (a) a flexible plastic sheet;
 (b) a plurality of plastic blade units molded integrally with said sheet and arranged in rows, each unit comprising a plurality of plastic blade elements upstanding from said plastic sheet, the base portion of the blade elements in each unit being adjacent each other and arranged to define a predetermined area; and
 (c) a plurality of collar members molded integrally with said sheet, each collar member encircling an associated blade unit and in contact with the base portion of the blade elements of said unit.
2. An artificial grass mat as recited in claim 1, wherein the units in each row are in staggered relation to the units in the rows adjacent thereto to provide a density distribution of the blade elements having the appearance of natural grass.
3. An artificial grass mat as recited in claim 1, wherein the blade elements in each unit are of differential height, the longer blades in each unit terminating respectively in a curved upper end portion to simulate the appearance of natural grass.
4. An artificial grass mat as recited in claim 1, wherein each blade element has a substantially triangular cross section throughout the length thereof.
5. An artificial grass mat as recited in claim 1, wherein the plastic sheet is formed with spaced drain openings, and further comprising co-acting means on adjacent mats for interconnecting said mats.
6. An artificial grass mat as recited in claim 5, wherein the co-acting means comprise a plurality of spaced studs and perforated tabs projecting from edge portions of each mat, whereby correlated pairs of studs and tabs of adjacent mats are in interengaged relation to each other.
7. An artificial grass mat as recited in claim 5, wherein the co-acting means comprise a flexible link having a pair of spaced studs upstanding therefrom, the studs of said link being received in a pair of drain openings located respectively in adjacent mats.

References Cited
UNITED STATES PATENTS

| | | | |
|---|---|---|---|
| 1,003,895 | 9/1911 | Gasthoff | 161—27 |
| 1,939,846 | 12/1933 | Fenton | 161—64 XR |
| 2,015,889 | 10/1935 | Fineman | 27—30 |
| 2,748,516 | 6/1956 | McClusky | 161—22 XR |
| 2,737,702 | 3/1956 | Schmidt et al. | 161—67 |
| 3,110,647 | 11/1963 | Tong | 161—31 |
| 3,181,219 | 5/1965 | Deshaies | 24—203 |
| 3,332,828 | 7/1967 | Faria et al. | 161—21 |
| 2,814,159 | 11/1957 | Green. | |
| 2,979,844 | 4/1961 | Lattuca. | |
| 3,154,884 | 11/1964 | Amar et al. | |
| 3,157,557 | 11/1964 | Palmer | 161—19 |

FOREIGN PATENTS 580,646  9/1946  Great Britain.

ROBERT F. BURNETT, *Primary Examiner.*

W. A. POWELL, *Assistant Examiner.*